United States Patent [19]

Takahashi et al.

[11] 4,290,452
[45] Sep. 22, 1981

[54] ROTARY-MOTION VALVE AND POWER-ASSISTED STEERING SYSTEM INCORPORATING THE VALVE

[75] Inventors: Koichi Takahashi, Yokohama; Megumu Higuchi, Tokyo, both of Japan

[73] Assignee: Nissan Motor Company, Limited, Yokohama, Japan

[21] Appl. No.: 60,792

[22] Filed: Jul. 25, 1979

[30] Foreign Application Priority Data

Aug. 7, 1978 [JP] Japan ................................. 53-95905

[51] Int. Cl.³ .......................... F15B 9/10; F16K 11/06
[52] U.S. Cl. .............................. 137/625.23; 91/375 R; 91/375 A
[58] Field of Search ...................... 137/625.23, 625.22, 137/625.21; 91/375 R, 375 A; 180/132, 148

[56] References Cited

U.S. PATENT DOCUMENTS

| | | | |
|---|---|---|---|
| 3,145,626 | 8/1964 | Vickers | 91/375 A |
| 3,773,081 | 11/1973 | Venable | 91/375 A |
| 3,807,456 | 4/1974 | Colletti | 91/375 A |
| 3,896,702 | 7/1975 | Shah | 91/375 A |
| 4,137,989 | 2/1979 | Rehfeld | 91/375 A |

*Primary Examiner*—Alan Cohan
*Attorney, Agent, or Firm*—Thompson, Birch, Gauthier & Samuels

[57] ABSTRACT

A rotary-motion directional fluid-flow control valve comprising an inner valve element rotatable about an axis therethrough and formed with concavities in its outer peripheral wall, an outer valve body rotatable about an axis aligned with the axis of rotation of the valve element and circumferentially slidable on the outer peripheral surface of the valve element, and plug members which are closely fitting in radial holes formed in the valve body and including a first plug member solid in its entirety and a second plug member formed with an axial bore, the first and second plug members being in registry with the concavities in the valve element in radial directions of the valve body depending upon the relative angular positions of the valve body and element. The valve may be advantageously use in a power-assisted steering system of an automotive vehicle.

33 Claims, 12 Drawing Figures

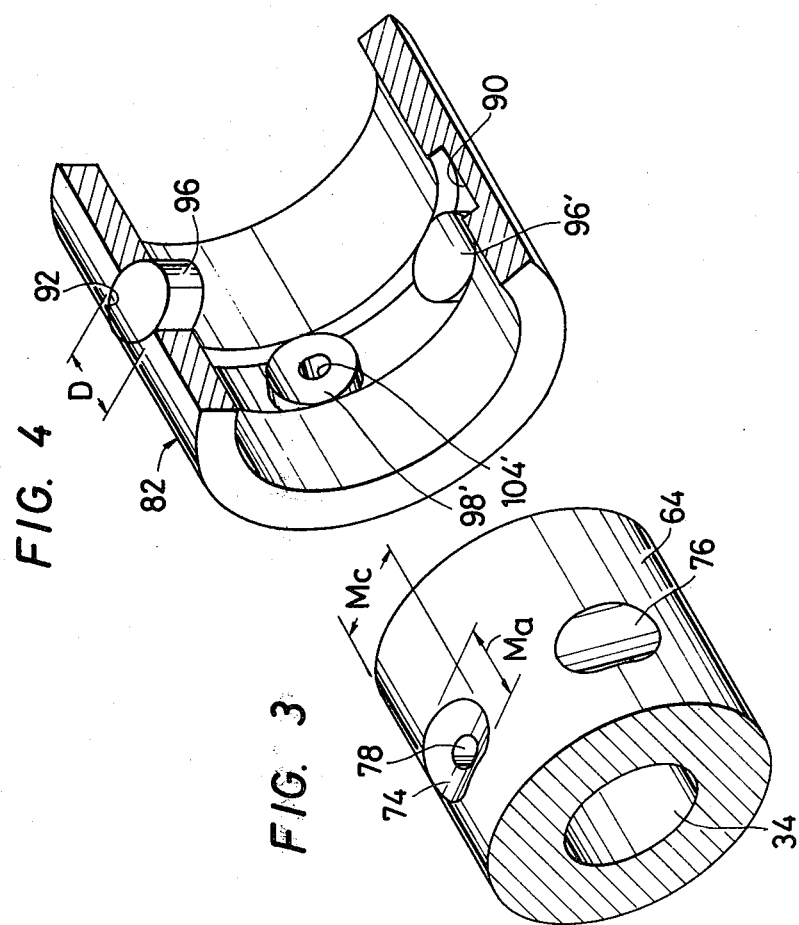

ROTARY-MOTION VALVE AND POWER-ASSISTED STEERING SYSTEM INCORPORATING THE VALVE

FIELD OF THE INVENTION

The present invention relates to a rotary-motion directional fluid-flow control having input and output members rotatable relative to each other about a common axis. While such a rotary-motion directional fluid-flow control valve may find various other practical applications where a rotation moment applied to any rotatable member is used as a driving force for the valve, a valve according to the present invention is useful especially when incorporated into a power-assisted steering system of an automotive vehicle. The present invention is thus further concerned with a power-assisted steering system having a rotary-motion directional fluid-flow control valve having input and output members rotatable relative to each other about a common axis.

DESCRIPTION OF THE PRIOR ART

Among the known power-assisted steering systems for automotive vehicles is a system of the type (Saginaw type) having a reaction control mechanism consisting essentially of input and output members rotatable relative to each other about a common axis and mechanically connected together by a torsion bar which is twistable about the common axis of rotation of the input and output members. The input member of the reaction control mechanism is ordinarily a stub shaft connected to and rotatable with the steering wheel shaft, while the output member of the reaction control mechanism may be the worm shaft of a worm-and-sector, worm-and-roller or worm-and-recirculating ball nut steering gear assembly or the pinion shaft of a rack-and-pinion steering gear assembly connected to the wheel axles of the steerable road wheels of the vehicle through a suitable steering linkage including a Pitman shaft by way of example. When there is a considerable resistance between the road surface and each of the steerable road wheels being urged to change their directions by a driver's manual steering effort applied to the steering wheel, the output member of the reaction control mechanism resists the turning motion of the input member or stub shaft with the result that there is caused an angular displacement between the input and output members about the common axis of rotation thereof. The angular displacement between the input and output members results in an angular deflection or twisting of the torsion bar about the axis of rotation of the input and output members. The reaction of the steerable road wheels to the steering effort applied to the steering wheel is thus transferred backwardly to the steering wheel and enables the vehicle driver to react to the resistance being produced between the road surface and each of the steerable road wheels. When the angle of twist of the torsion thus serving as a self-centering spring element in the reaction control mechanism, viz., the angle of displacement between the input and output members of the reaction control mechanism exceeds a predetermined value, a rotary-motion directional fluid-flow control valve mechanically connected to the input and output members is actuated. By actuation of the valve, hydraulic power is applied to the steering gear assembly so that the steering system is operated not only by the driver's manual effort applied to the steering wheel but additionally by the hydraulic power thus imparted to the steering gear assembly through the fluid-flow control valve.

The rotary-motion directional fluid-flow control valve used in a power-assisted steering system of the type above described includes a generally cylindrical inner valve element rotatable with the input member of the reaction control mechanism and a generally cylindrical outer valve body circumferentially slidable on the outer peripheral surface of the inner valve element and rotatable with the output member of the reaction control mechanism. Each of the valve element and valve body is formed with a plurality of slots arranged circumferentially of the valve element or body so that the slots in the valve element are respectively brought into or out of registry with the slots in the valve body depending upon the angular relationship between the valve element and body and accordingly between the input and output members of the reaction control mechanism about the common axis of rotation thereof. One of the drawbacks encountered in a rotary-motion valve of this type is that the valve element and body each must be precision machined to provide extremely high dimensional accuracy in forming the slots therein, especially in a circumferential direction of the valve element or body. The slots in each of the valve element and body are usually formed by the use of a grinding tool having an abrasive surface with a width equal to the lateral measurement of each of the slots in the circumferential direction of the valve element or body. If, therefore, the grinding tool to be used for the machining of the valve element or body fails to have an acceptable order of dimensional accuracy, the error in the effective measurement of the grinding tool results directly in an error in the measurement of each slot in the valve element or body. Exacting control of the dimensional accuracy of grinding tools has for this reason been essential to manufacture the valve element and body, especially the outer valve body to slidably fit on the inner valve element of a known rotary-motion directional fluid-flow of the described general nature. The present invention contemplates elimination of such a drawback inherent in a conventional rotary-motion directional fluid-flow control valve.

SUMMARY OF THE INVENTION

It is, accordingly, an object of the present invention to provide a rotary-motion directional fluid-flow control valve having a valve element and a valve body which need not be precision machined but which are nevertheless capable of providing excellent accuracy of operation.

It is another object of the present invention to provide a power-assisted steering system having such an improved rotary-motion valve incorporated therein.

In accordance with one outstanding aspect of the present invention, there is provided a rotary-motion directional fluid-flow control valve comprising, in combination, a generally cylindrical valve element rotatable about an axis therethrough and having formed in its outer peripheral wall at least two concavities arranged in predetermined angular position about the axis of rotation of the valve element, a generally cylindrical valve body which is rotatable about an axis substantially in line with the axis of rotation of the valve element and which is circumferentially slidable on the outer peripheral surface of the valve element, the valve body having an internal circumferential groove formed in its inner peripheral wall and circumferentially extending over the concavities in the valve element at least two radial holes which are arranged in predetermined angular relationship to each other about the axis of rotation of the valve body, and at least two plug members closely fitting in the above mentioned radial holes, respectively, and projecting into the internal circumferential groove in the valve body for dividing the circumferential groove into arcuate groove portions which are separate from each other across the individual plug members, the plug members including a first plug member which is solid in its entirety and a second plug member formed with a bore which is open at one end to the outer peripheral wall of the valve element and which is at least partially communicable with one of the concavities in the valve element depending upon the relative angular positions of the valve element and the valve body about the respective axes of rotation of the valve element and body, the concavities in the valve element being substantially in registry with the first and second plug members, respectively, in radial directions of the valve element and valve body when the valve element and the valve body are in the aforesaid predetermined relative angular positions thereof.

In accordance with another outstanding aspect of the present invention, there is provided a power-assisted steering system which comprises, in combination, first and second rotatable members which are rotatable relative to each other about a common axis of rotation, a self-centering spring element interconnecting the first and second rotatable members together and biasing the two members to hold predetermined relative angular positions about the common axis of rotation thereof, a generally cylindrical valve element rotatable with the first rotatable member about the aforesaid axis of rotation and having formed in its outer peripheral wall at least two concavities arranged in predetermined angular relationship to each other about the axis of rotation of the valve element, a generally cylindrical valve body which is rotatable with the second rotatable member about the aforesaid axis of rotation and which is circumferentially slidable on the outer peripheral surface of the valve element, the valve body having an internal circumferential groove formed in its inner peripheral wall and circumferentially extending over the concavities in the valve element and at least two radial holes which are arranged in predetermined angular relationship to each other about the axis of rotation of the valve body, and at least two plug members closely fitting in the radial holes, respectively, and projecting into the internal circumferential groove in the valve body for dividing the internal circumferential groove into arcuate groove portions which are separate from each other across the individual plug members. The plug members including a first plug member is solid in its entirety and a second plug member formed with a bore which open at one end to the outer peripheral wall of the valve element and which is at least partially communicable with one of the concavities in the valve element depending upon the relative angular positions of the valve element and the valve body, the concavities in the valve element being substantially in registry with the first and second plug members, respectively, in radial directions of the valve element and body when the valve element and the valve body are in the previously mentioned predetermined relative angular positions thereof about the common axis of rotation thereof. The first rotatable member of the steering system thus constructed may be a stab shaft connected to the steering wheel shaft while the second rotatable member of the steering system may be a worm or pinion shaft engaging the steering gear assembly coupled to the wheel axles of the dirigible road wheels of an automotive vehicle. The self-centering spring element may be constituted by a torsion connected at both axial ends thereof to the first and second rotatable members.

DESCRIPTION OF THE DRAWINGS

The features and advantages of a rotary-motion directional fluid-flow control valve according to the present invention and a power-assisted steering system incorporating such a valve will be more clearly understood from the following description taken in conjunction with the accompanying drawings, in which:

FIG. 3 is a fragmentary perspective view showing the inner valve element or socket end portion forming part of the rotary-motion valve incorporated into the steering system shown in FIGS. 1 and 2;

FIG. 4 is a partially cut-away perspective view showing the inner cylindrical member forming part of the valve;

DETAILED DESCRIPTION OF THE EMBODIMENT

Figure 1:
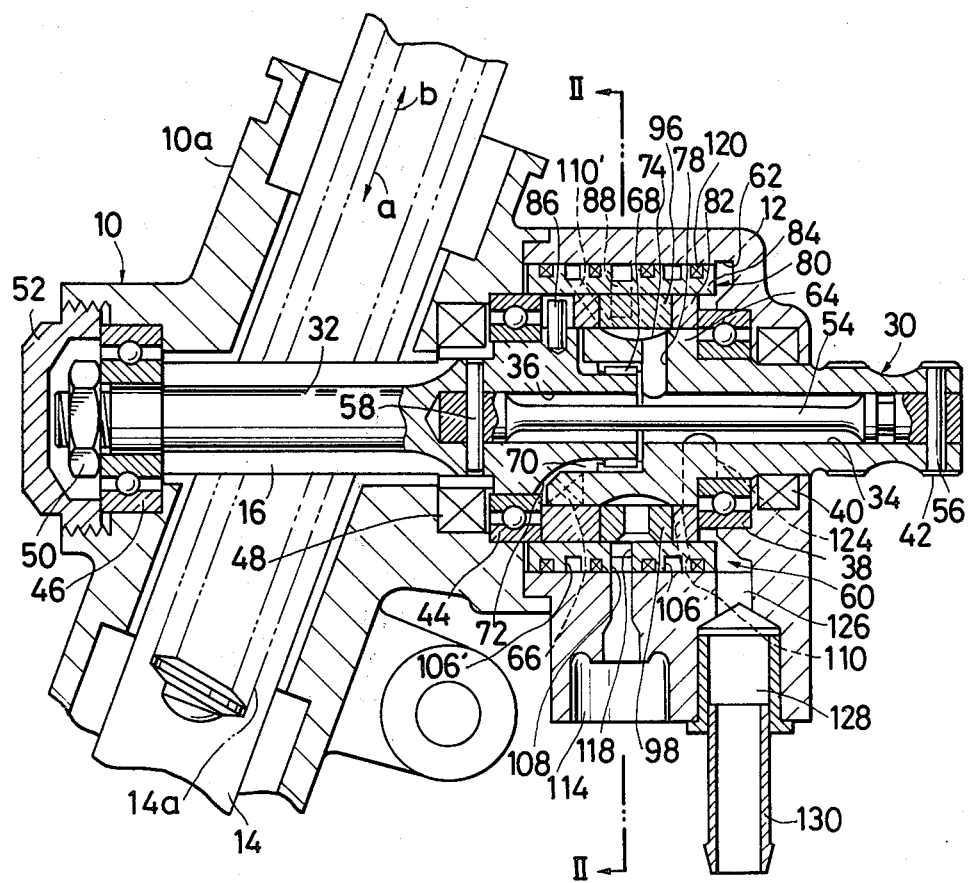
FIG. 1 is a longitudinal sectional view showing a preferred embodiment of a power-assisted steering system, especially, the steering gear assembly and a reaction control mechanism combined with a rotary-motion directional fluid-flow control valve according to the present invention.
Figure 2:
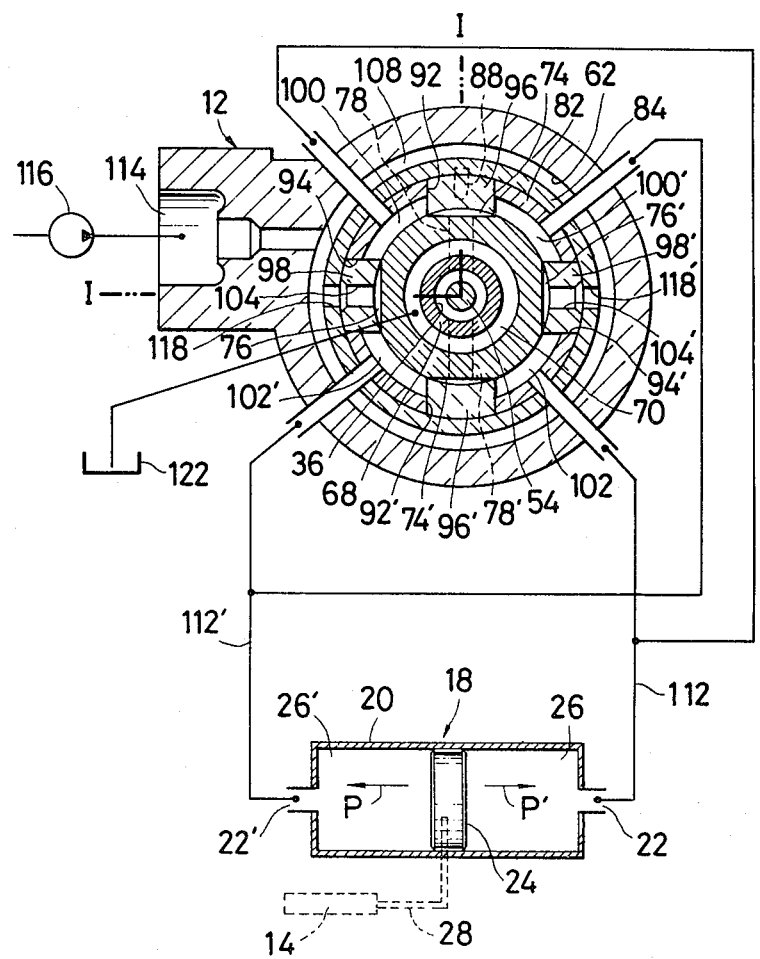
FIG. 2 is a cross sectional view taken on line II—II of FIG. 1, the longitudinal section in FIG. 1 being taken on planes indicated by lines I—I in FIG. 2.

The construction and arrangement of an angular-displacement or rotary-motion directional fluid-flow control valve according to the present invention will be hereinafter described with reference to the accompanying drawings, particularly first to FIGS. 1 to 4 thereof. In FIGS. 1 to 4 of the drawings, the rotary-motion directional fluid-flow control valve embodying the present invention is assumed to be incorporated into a power-assisted steering system of an automotive vehicle by way of example. As shown in FIG. 1, the power-assisted steering system comprises a stationary casing structure including a steering gear housing 10 and a valve housing 12 secured to or otherwise fixedly held with respect to the gear housing 10 by suitable fastening means (not shown). The gear housing 10 has provided therein a steering gear assembly which in the arrangement shown is assumed to be of the rack and pinion type and which thus includes a toothed rack 14 enclosed within a generally tubular portion 10a of the gear housing 10 and a pinion gear 16 meshing with the teeth 14a of the rack 14 as schematically illustrated in FIG. 1. When the pinion gear 16 is driven to turn about the center axis thereof, the toothed rack 14 is caused to longitudinally move in either of the directions indicated by arrows a and b depending upon the direction of rotation of the pinion gear 16. As is well known in the art, such a movement of the toothed rack 14 is transmitted by way of a suitable steering linkage (not shown) to the axles of the steerable roads wheels (not shown) of a vehicle and causes the road wheels to turn to the right or left from or toward the straight-ahead positions thereof. The movement of the rack 14 is assisted by a hydraulic power transmitted thereto from a suitable power cylinder which is shown schematically at 18 in FIG. 2. In FIG. 2, the power cylinder 18 is illustrated to comprise, by way of example, a hollow cylinder body 20 having fluid ports 22 and 22' at the opposite axial ends thereof and a piston 24 mounted for reciprocal movement within the cylinder body 20. The piston 24 thus forms in the cylinder body 20 first and second fluid chambers 26 and 26' which are hermetically isolated from each other by the piston 24 and which are continuously variable in volume depending upon the axial position of the cylinder body 20 in relation to the piston. The above mentioned fluid ports 22 and 22' are open to these first and second fluid chambers 26 and 26', respectively. The toothed rack 14 of the steering gears assembly is mechanically connected to or held in engagement with the piston 24 of the power cylinder 18 by suitable fastening or coupling means schematically indicated at 28 in FIG. 2.

Turning back to FIG. 1, the power-assisted steering system is shown to further comprise a reaction control mechanism comprising axially elongated first and second rotatable members or rotatable mechanical input and output members 30 and 32 having respective axes of rotation substantially aligned with each other. The input member 30 is formed with an axial bore 34 longitudinally extending throughout the length thereof, while the output member 32 is formed with a blind axial bore 36 which is open at the inner end adjacent to the input member 30 and which is axially aligned with and contiguous to the axial bore 34 in the input member 30. The input member 30 is rotatably mounted on the valve housing 12 by means of a suitable bearing unit such as a ball bearing unit 38 consisting of an inner race member fitting on the input member 30 and an outer race member fitting on an annular internal surface portion of the valve housing 12 with a plurality of balls rollably interposed between the inner and outer race members. Adjacent to the bearing unit 38 thus arranged, the valve housing 12 is formed with an annular internal groove encircling an axial portion of the input member 30 and has fitted in the groove a ring-shaped seal element 40 providing a hermetic seal between the valve housing 12 and the input member 30. The input member 30 axially projects from the valve housing 12 and has external splines 42 in its axial end portion projecting from the valve housing 12. The input member 30 is connected to a steering wheel shaft (not shown) through these external splines 42. On the other hand, the output member 32 of the reaction control mechanism axially extends in part within the gear housing 10 and in part within the valve housing 12 and is rotatably mounted on the gear housing 10 by suitable bearing means such as a ball bearing unit 44 located in the neighborhood the inner axial end of the output member 32 and a ball bearing unit 46 disposed adjacent to the outer axial end of the member 32 as shown. Each of the ball bearing units 44 and 46 is made up of an inner race member fitting on the output member 32 and an outer race member fitting on an annular internal surface portion of the gear housing 10 with a plurality of balls rollably interposed between the two race members. Adjacent the bearing unit 44 thus provided in the neighborhood of the inner axial end of the output member 32, the gear housing 10 is formed with an annular internal groove encircling an axial portion of the output member 32 and has fitted in the groove a ring-shaped seal element 48 providing a hermetic seal between the gear housing 10 and the output member 32. The bearing unit 46 disposed adjacent to the outer axial end of the output member 32 is held in position on the output member 32 by suitable gearing retaining means such as a lock nut 50 engaging an externally threaded end portion of the output member 32. The lock nut 50 is enclosed within a plug member 52 threaded into the gear housing 10. The pinion gear 16 forming part of the previously described steering gear assembly is securely mounted on the output member 32 thus arranged and has its axis of rotation coincident with the axis of rotation of the output member 32.

The reaction control mechanism of the power-assisted steering mechanism further comprising an axially elongated torsion bar 54 which functions a self-centering spring means for the input and output members 30 and 32 in the reaction control mechanism. The torsion bar 54 axially extend through the axial bore 34 in the input member 30 into the axial bore 36 in the output member 32 and is securely anchored adjacent one axial end thereof to the input member 30 by means of a cross pin 56 and adjacent the other axial end thereof to the output member 32 by means of a cross pin 58. Each of the cross pins 56 and 58 thus connecting the torsion bar 54 to the input and output members 30 and 32, respectively, extends transversally through each of the axial end portions of the bar 54 and is secured at its opposite end portions into each of the input and output members 30 and 32. The torsion bar 54 has a center axis which is substantially coincident in part with the axis of rotation of the input member 30 and in part with the axis of rotation of the output member 32.

When a manual steering effort is applied to the steering wheel by the driver of the vehicle, the input member 30 of the reaction control mechanism is caused to turn in either direction about the axis of rotation thereof. The torque thus applied to the input member 30 is transmitted through the cross pin 56, torsion bar 54 and cross pin 58 to the output member 32 and urges the output member 32 to also turn about the axis of rotation thereof in the same direction as the direction of turn of the input member 30. The driving force thus imparted to the output member 32 of the reaction control mechanism is transmitted by way of the steering gear assembly and linkage to the steerable road wheels of the vehicle and urges the road wheels to turn to the right or left from the positions which the road wheels have maintained. If, under these conditions, a resistance is produced between the road surface and each of the steerable road wheels being thus urged to change their directions, the resistance is transmitted backwardly. in effect, through the steering linkage and the steering gear assembly to the output member 32 of the reaction control mechanism so that the output member resists the rotational motion of the input member 30. The resistance of the output member 32 to the rotational motion of the input member 30 causes the torsion bar 54 to angularly deflect and twist about the center axis thereof in the same direction as the direction of turn of the input member 30 and thereby provide a controlled resistance to the movement of the steering wheel, enabling the vehicle driver to react to the resistances developed between the road surface and the steerable road wheels of the vehicle and to "feel the road". The torsion bar 54 thus twisted about the center axis thereof acts as self-centering spring means urging the input and output members 30 and 32 to resume their initial or neutral angular positions relative to each other about the respective axes of rotation thereof. If, on the other hand, there is no considerable resistance produced between the road surface and each of the steerable road wheels being urged to steer, the rotational motion of the input member 30 is followed by the output member 32 without being subjected to positive resistance with the result that the steering effort applied to the steering wheel is carried substantially unresistedly to the steerable road wheels of the vehicle through the input member 30, torsion bar 54 and output member 32 of the reaction control mechanism and further by way of the steering gear assembly and the steering linkage, causing the steerable wheels to change their respective directions through angles dictated by the angle of the rotational movement of the steering wheel. Under these conditions, the torsional bar 54 holds the input and output members 30 and 32 of the reaction control mechanism in their initial or neutral angular positions relative to each other about the respective axes of rotation thereof.

When the input and output members 30 and 32 of the reaction control mechanism are thus allowed to maintain their neutral angular positions relative to each other about the respective axes of rotation and as a consequence the rotational motion of the input member 30 is followed by the output member 32 substantially unresistedly, the toothed rack 14 of the steering gear assembly is driven to move and accordingly the steerable road wheels of the vehicle are steered without assistance of hydraulic power solely by the manual effort which is applied to the steering wheel by the vehicle driver. When, however, the manual effort applied to the steering wheel is resisted by the steerable road wheels of the vehicle and as a consequence the torsion bar 54 forming part of the reaction control mechanism is caused to deflect and twist about the center axis thereof, the movement of the toothed rack 14 of the steering gear assembly and accordingly the motions of the steerable road wheels to change their directions are assisted by a hydraulic fluid pressure which is applied to the rack 14 from the power cylinder 18 (FIG. 2) under the control of a rotary-motion directional fluid-flow control valve which is incorporated into the valve housing 12 as indicated generally at 60 in FIGS. 1 and 2.

The valve housing 12 is thus formed with a generally cylindrical cavity 62 surrounding inner axial end portions of the input and output members 30 and 32 projecting into the valve housing 12. The input member 30 has an enlarged, generally cylindrical, hollow inner axial end portion or socket end portion 64 which is formed with a generally cylindrical cavity open at the inner axial end of the socket end portion 64 and which has generally cylindrical inner and outer peripheral surfaces having a common center axis which is substantially coincident with the axis of rotation of the input member 30 and accordingly with the center axis of the torsion bar 54, as will be best seen from FIG. 2. The socket end portion 64 of the input member 30 has a pair of axial extensions (only one of which is seen at 66 in FIG. 1) axially projecting from the socket portion 64 and angularly spaced apart at predetermined angled from each other about the axis of rotation of the input member 30. The socket portion 64 further has an annular shoulder face contacting one axial end face of the inner race member of the bearing unit 38 on the input member 30 and thus holds the bearing unit 38 axially in position on the valve housing 12. On the other hand, the output member 32 of the reaction control mechanism has a reduced inner axial end portion 68 axially projecting into the above mentioned concavity in the socket end portion 64 of the input member 30. The reduced inner axial end portion 68 of the output member 32 has a cylindrical outer peripheral surface having a center axis substantially coincident with the axis of rotation of the output member 32. The outer peripheral surface of the inner axial end portion 68 is uniformly spaced apart radially inwardly from the inner peripheral surface of the socket end portion 64 of the input member 30 so that a gap 70 having an annular cross section is formed between the inner peripheral surface of the socket end portion 64 of the input member 30 and the outer peripheral surface of the inner axial end portion 68 of the output member 32 as will be best seen in FIG. 2. The output member 32 is further formed with a pair of axial grooves 72 terminating at the inner axial end of the output member 32 and having respectively received therein the axial extensions 66 of the socket end portion 64 of the input member 30, as will be seen from FIG. 1. Each of the axial grooves 72 in the output member 32 is slightly larger in width than each of the axial extensions 68 of the socket end portion 64 of the input member 30 so as to allow the input and output members 30 and 32 predetermined degrees of freedom of rotation relative to each other about the respective axes of rotation thereof when the torsion bar 54 is caused to twist between the members 30 and 32. Such engagement between the input and output members 30 and 32 prevents the torsion bar 54 from being twisted through an angle larger than a predetermined angle about the center axis of the bar and, thus, provides a safeguard against overstressing of the torsion bar 54 when the steering system in operated without assistance of hydraulic power.

As shown in FIG. 2, the socket end portion 64 of the input member 30 has formed in its outer peripheral wall four generally elliptic or semi-oval depressions or concavities which are arranged circumferentially of the socket end portion 64 and substantially symmetrically with respect to the axis of rotation of the input member 30. The four concavities consist of a first pair of concavities 74 and 74' diametrically opposite to each other across the axis of rotation of the input member 30, and a second pair of concavities 76 and 76' diametrically opposite to each other across the axis of rotation of the input member 30 and arranged at the angular intervals of 90 degrees from the first pair of concavities 74 and 74' about the axis of rotation of the input member 30. Each of the concavities 74, 74', 76 and 76' thus arranged is configured to have a curved surface which, in effect, forms part of a geometric cylinder having a center axis substantially perpendicular, in non-intersecting relationship, to the axis of rotation of the input member 30 as will be better seen from FIG. 3 in which only the concavities 74 and 76 are shown. For the sake of convenience in referring to the drawings, the first pair of concavities 74 and 74' will be hereinafter referred to as upper and lower concavities, respectively, and, likewise, the second pair of concavities 76 and 76' will be referred to as left and right concavities, respectively. The socket end portion 64 of the input member 30 is further formed with radial holes 78 and 78' which are open at their respective inner axial ends to the axial bore 34 in the input member 30 and at their respective outer axial ends to the upper and lower concavities 74 and 74', respectively, in the socket end portion 64 as shown in FIG. 2. The holes 78 and 78' thus formed in the socket end portion 64 of the input member 30 will be hereinafter referred to as upper and lower radial holes, respectively, for ease of reference to the drawings. The socket end portion 64 of the input member 30 thus constructed and arranged constitutes an inner valve element or valve sleeve which, in effect, forms part of the rotary-motion valve 60. The inner valve element or valve sleeve is constructed as an integral part of the input member 30 in the embodiment herein shown but, if desired, may be formed separately of the input member and securely connected to the input member by suitable fastening means.

The rotary-sleeve directional fluid-flow control valve 60 incorporated into the steering system shown in the drawings comprises, in addition to the socket end portion 64 of the input member 30, a generally cylindrical valve body 80 concentrically surrounding the socket end portion 64 and rotatable with the output member 32. The valve body 80 consists essentially of inner and outer cylindrical members 82 and 84 each having inner and outer peripheral surfaces which have a common center axis substantially coincident with the respective axes of rotation of the input and output members 30 and 32. The inner cylindrical member 82 is positioned axially between the bearing units 38 and 44 on the input and output members 30 and 32, respectively, and is circumferentially slidable on the outer peripheral surface of the socket end portion 64 of the input member 30. The inner cylindrical member 82 is secured to the output member 32 by suitable fastening means such as a pin or stud 86 which is anchored at one end to the cylindrical member 82 and at the other end to the output member 32 in the neighborhood of the reduced inner axial end portion 68 of the output member 32 as shown in FIG. 1. On the other hand, the outer cylindrical member 84 of the valve body 80 is securely attached to the outer peripheral surface of the inner cylindrical member 82 by suitable fastening means such as a pin or stud 88 which is in part embedded in the outer cylindrical member 84 and in part anchored to the inner cylindrical member 82 as indicated by broken lines in FIGS. 1 and 2. The outer cylindrical member 84 has its outer peripheral wall circumferentially slidably fitting on a generally cylindrical internal surface portion of the valve housing 12 defining the cavity 62 therein.

As will be best seen from FIG. 4, the inner cylindrical member 82 thus forming part of the valve body 80 has an internal circumferential groove 90 in its inner wall slidably contacting the outer peripheral surface of the socket end portion 64 of the input member 30. The internal circumferential groove 90 is arranged axially of the socket end porton 64 of the input member 30 in such a manner as to circumferentially extend in part over the concavities 74, 74', 76 and 76' in the socket end portion 64. The inner cylindrical member 82 is further formed with four radial holes 92, 92', 94 and 94' which are arranged substantially symmetrically with respect to the center axis of the cylindrical member 82 and accordingly at the angular intervals of 90 degrees about the center axis of the cylindrical member 82. Each of the radial holes 92, 92', 94 and 94' has a circular cross section having a diameter substantially slightly larger than the width of the circumferential groove 90 or, more exactly, having, in the axial direction of the cylindrical member 82, diametrically opposite ends at the opposite axial ends, respectively, of the circumferential groove 90. The holes 92, 92', 94 and 94' in the inner cylindrical member 82 are arranged to be respectively in registry with the upper, lower, left and right concavities 74, 74', 76 and 76' in the socket end portion 64 of the input member 30 when the input and output members 30 and 32 are in the previously mentioned neutral angular positions relative to each other about the respective axes of rotation of the members 30 and 32 as illustrated in FIG. 2. Plug members 96, 96', 98 and 98' having circular cross sections substantially conforming to the circular cross sections of these radial holes tightly fit in the radial holes 92, 92', 94 and 94', respectively, in the inner cylindrical member 82 and project into the internal circular groove 90 radially inwardly of the cylindrical member 82 as shown in FIG. 2 and will be seen in part but more clearly from FIG. 4. Each of the plug members 96, 96', 98 and 98' has radially of the cylindrical member 82 inner and outer end faces which are curved conformingly to the inner and outer peripheral surfaces, respectively, of the cylindrical member 82 in circumferential directions of the cylindrical member 82. Thus, each of the inner and outer end faces of each plug member forms, in effect, a part of a geometrical cylinder conforming to each of the inner and outer peripheral surfaces of the inner cylindrical member 82, as will be seen from FIG. 4. In the following description, the plug members 96 and 96' will be referred to as upper and lower plug members, respectively, and, likewise, the plug members 98 and 98' will be referred to as left and right plug members, respectively, for ease of reference to the drawings, particularly to FIG. 2. The internal circumferential groove 90 in the inner cylindrical member 82 is divided by these plug members into four separate groove portions arcuately extending on the outer peripheral surface of the socket end portion 64 of the input member 30. As illustrated in FIG. 2, such groove portions consist of a first pair of diametrically opposite groove portions 100 and 102 formed between the upper and left plug members 96 and 98 and the lower and right plug members 96' and 98', respectively, and a second pair of diametrically opposite groove portions 100' and 102' formed between the upper and fight plug members 96 and 98' and the lower left plug members 96' and 98, respectively. While each of the upper and lower plug members 96 and 96' is solid in its entirety, i.e., closing off their respective holes 92, 92', the left and right plug members 98 and 98' are formed with axial bores 104 and 104', respectively, each open at both ends thereof in radial directions of the inner cylindrical member 82 as shown in FIG. 2. The axial bores 104 and 104' in the left and right plug members 98 and 98' are thus open to the left and right concavities 76 and 76', respectively, in the socket end portion 64 of the input member 30. Each of the concavities 74, 74', 76 and 76' in the socket end portion 64 of the input member 30 has, in its direction parallel with the axis of rotation of the input member 30, a measurement Ma slightly smaller than the diameter D (FIG. 4) of each of the plug members 96, 96', 98 and 98' and, in its direction perpendicular in non-intersecting relationship to the axis of rotation of the input member 30, a measurement Mc slightly larger than the diameter D of each of the plug members. When the input and output members 30 and 32 are in the previously mentioned neutral angular positions relative to each other about the respective axes of rotation thereof, there are formed two generally crescent-shaped gaps or orifices (indicated at G and G' in FIG. 9A) between diametrically opposite edge portions of each plug member and circumferentially opposite edge portions of each of the concavities 74, 74', 76 and 76' in the direction of the measurement Mc of each concavity, allowing each of the concavities 74, 74', 76 and 76' to be open to the groove portions 100 and 100', 102 and 102', 100 and 102' or 100' and 102 through such orifices. Thus, the axial bore 104 in the left plug member 98 communicates with the groove portions 100 and 102' through the left concavity 76 in the socket end portion 64 of the input member 30 and, likewise, the axial bore 104' in the right plug member 98 communicates with the groove portions 100' and 102 through the right concavity 76' in the socket end portion 64 when the input and output members 30 and 32 are in the neutral angular positions thereof relative to each other about the axes of rotation thereof.

On the other hand, the outer cylindrical member 84 of the valve body 80 has four annular lands circumferentially slidable on the previously mectioned cylindrical internal surface portion of the valve housing 12 defining the cavity 62 therein. The annular lands are spaced apart from each other axially of the cylindrical member 84 which has therefore formed in its outer peripheral wall three annular grooves which are isolated from each other. The three annular grooves consist of first and second annular grooves 106 and 106' respectively located adjacent the opposite axial ends of the outer cylindrical member 84 and a third annular groove 108 located intermediate between the first and second annular grooves 106 and 106' as shown in FIG. 1. The first annular groove 106 is in constant communication with the first pair of arcuate groove portions 100 and 102 in the inner cylindrical member 82 through suitable passageway means shown including passageways formed in the inner and outer cylindrical members 82 and 84 as indicated by dotted lines at 110 in FIG. 1. Similarly, the second annular groove 106' in the outer cylindrical member 84 is in constant communication with the arcuate groove portions 100' and 102' through suitable passageway means such as passageways 110' formed in the inner and outer cylindrical members 82 and 84 as indicated by dotted lines at 110' in FIG. 1. The first and second annular grooves 106 and 106' in the outer cylindrical member 84 are, in turn, in constant communication with the first and second fluid chambers 26 and 26' of the power cylinder 18 through passageway means 112 and 112', respectively, as schematically illustrated in FIG. 2. On the other hand, the third annular groove 108 formed in the outer cylindrical member 84 of the valve body 80 is in constant communication with a source of fluid under pressure through suitable passageway means shown including a fluid inlet port 114 formed in the valve housing 12. The source of the pressurized fluid may be an oil pump 116 driven by the engine of an automotive vehicle. The outer cylindrical member 84 is further formed with two, left and right radial holes 118 and 118' open at their respective outer axial ends to the third annular groove 108 in the cylindrical member 84 and at their inner axial ends to the axial bores 104 and 104' in the left and right plug members 98 and 98', respectively, thereby providing constant communication between the fluid inlet port 114 in the valve housing 12 and each of the left and right concavities 76 and 76' in the socket end portion 64 of the input member 30 through the third annular groove 108 and each of the radial holes 118 and 118' in the outer cylindrical member 84 and each of the axial bores 104 and 104' in the left and fight plug members 98 and 98'. The first, second and third annular grooves 106, 106' and 108 thus arranged are hermetically sealed off from each other by ring-shaped sealing elements 120 respectively received in annular grooves formed in the four annular lands of the outer cylindrical member 84 and slidably fitting on cylindrical internal surface portion of the valve housing 12 as illustrated in FIG. 1. The axial bore 34 in the input member 30 is in constant communication with a fluid reservoir 122 through suitable passageway means shown including a passageway 124 formed in the which are formed in the valve housing 12, and a passageway in a tubular fitting 130 inserted at one end into the fluid discharge port 128 and connected at the other end to a suitable conduit (not shown) leading to the fluid reservoir 122.

The modes of operation of the power-assisted steering system using the rotary-motion directional fluid-flow control valve 60 thus constructed and arranged will be hereinafter described with reference to FIGS. 1 to 5 of the drawings.

When the steerable road wheels of the vehicle are encountering relatively small resistances from the road surface, the manual steering effort applied to the steering wheel by the vehicle driver is followed substantially unresistedly by the road wheels. Under such a condition, the input and output members 30 and 32 of the reaction mechanism of the steering system are caused to bodily turn as a single unit with the torsion bar 54 about the respective axes of rotation of the input and output members 30 and 32 without causing the torsion bar 54 to deflect about the center axis thereof. The input and output members 30 and 32 are therefore allowed to stay in their neutral angular positions relative to each other about the respective axes of rotation thereof as indicated in FIG. 2. The input and output members 30 and 32 being thus held in the neutral angular positions relative to each other, the individual concavities 74, 74', 76 and 76' in the socket end portion 64 of the input member 30 are located in registry with the plug members 96, 96', 98 and 98', respectively, in radial directions of the valve 60 so that each of the concavities is permitted to be open to the arcuate groove portions 100 and 100', 102 and 102', 100 and 102' or 100' and 102 in the inner cylindrical member 82 through the previously described crescent-shaped gaps or orifices adjacent the opposite edge portions of each concavity in the direction of the measurement Mc (FIG. 3). The fluid under pressure supplied from the oil pump 116 to the fluid inlet port 114 in the valve housing 12 is therefore passed on the one hand to the arcuate groove portions 100 and 102' through the third annular groove 108 and the left radial nole 118 in the outer cylindrical member 84 of the valve body 80 and past the axial bore 104 in the left plug member 98 and the left concavity 76 in the socket end portion 64 of the input member 30 and, on the other hand, to the arcuate groove portions 100' and 102 through the third annular groove 108 and the right radial hole 118' in the outer cylindrical member 84 of the valve body 80 and past the axial bore 104' in the right plug member 98' and the right concavity 76' in the socket portion 64 of the input member 30. The fluid thus passed to each of the first pair of arcuate groove portions 100 and 102 is directed through the passageways 110 in the inner and outer cylindrical members 82 and 84 and the first annular groove 106 in the outer cylindrical member 84 to the passageway means 112 and is supplied by way of the passageway means 112 into the first fluid chamber 26 of the power cylinder 18. On the other hand, the fluid passed to each of the second pair of arcuate groove portions 100' and 102' is directed through the passageways 110' in the inner and outer cylindrical members 82 and 84 and the second annular groove 106' in the outer cylindrical member 84 to the passageway means 112' and is supplied by way of the passageway means 112' into the second fluid chamber 26' of the power cylinder 18. Furthermore, the fluid which has entered each of the arcuate groove portions 100 and 100' on both sides of the upper plug member 96 in the inner cylindrical member 82 is allowed into the axial bore 34 in the input member 30 through the upper concavity 74 and the upper radial hole 78 in the socket end portion 64 of the input member 30 and, likewise, the fluid which has entered each of the arcuate groove portions 100' and 102' on both sides of the lower plug member 96' in the inner cylindrical member 82 is allowed into the axial bore 34 in the member 30 through the lower concavity 74' and the lower radial hole 78' in the socket end portion 64 of the input member 30. The fluid which is thus admitted into the axial bore 34 in the input member 30 is discharged to the fluid reservoir 122 (FIG. 2) through the passageway 124 in the input member 30 and the passageway 126 and fluid discharge port 128 in the valve housing 12 and by way of the fitting 130 (FIG. 1). The fluid pressure entering each of the groove portions 100, 100', 102 and 102' being thus discharged through the crescentshaped gaps or orifices formed by each of the upper and lower concavities 74 and 74', the fluid directed into each of the first and second fluid chambers 26 and 26' of the power cylinder 18 can not develop a fluid pressure to act on the piston 24, which is accordingly held in situ within the cylinder body 20. The piston 24 being thus held at rest, no driving force is transferred from the piston 24 of the power cylinder 18 to the toothed rack 14 of the steering gear assembly so that the steering system is operated without assistance of hydraulic power, viz., solely by the vehicle driver's manual steering effort applied to the steering wheel.

Figure 5:
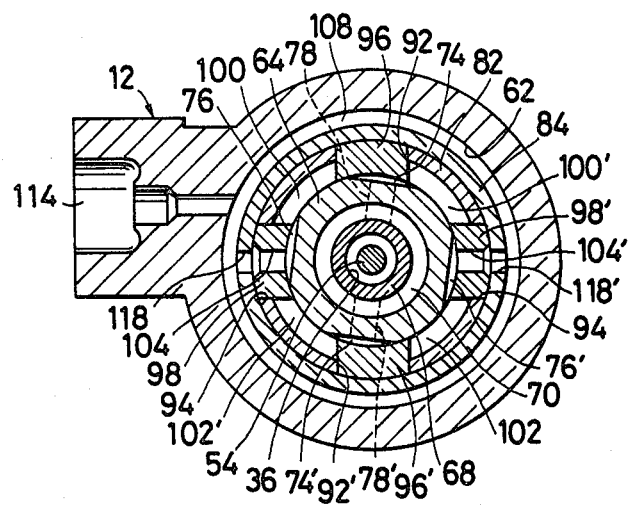
FIG. 5 is a view similar to FIG. 2 but shows the rotary-motion valve in a different operational condition.

When the steerable road wheels of the vehicle are subjected to considerable resistances from the road surface, the output member 32 of the reaction control mechanism resists the turning motion of the input member 32 being driven to turn about the axis of rotation thereof by the vehicle driver's manual steering effort applied to the steering wheel. Under such a condition, the turning motion of the input member 30 is not followed by the output member 32 so that the torsion bar 54 is forced to twist about the center axis thereof and causes the input and output members 30 and 32 to angularly deviate from their neutral angular positions about the respective axes of rotation thereof. The input and output members 30 and 32 being thus caused to turn relative to each other about the respective axes of rotation thereof, each of the concavities 74, 74', 76 and 76' in the socket end portion 64 of the input member 30 is isolated from one of the arcuate groove portions on both sides of the plug member adjacent the particular concavity. If, for example, the input member 30 is caused to turn clockwise in FIG. 2 relative to the output member 32 about the axis of rotation thereof as shown in FIG. 5, the upper and lower concavities 74 and 74' in the socket end portion 64 of the input member 30 are isolated from the first pair of arcuate groove portions 100 and 102, respectively, and the left and right concavities 76 and 76' in the socket end portion 64 are isolated from the second pair of arcuate groove portions 102' and 100', respectively. Thus, the upper and lower concavities 74 and 74' are now open to the second pair of arcuate groove portions 100' and 102', respectively, alone and the left and right concavities 76 and 76' are open to the first pair of arcuate groove portions 100 and 102, respectively, alone. The fluid pressure directed through the fluid inlet port 114 in the valve housing 12 into the third annular groove 108 in the outer cylindrical member 84 of the valve body 80 is passed on the one hand to the arcuate groove portion 100 through the left radial hole 118 in the outer cylindrical member 84 and past the axial bore 104 in the left plug member 98 and the left concavity 76 in the socket end portion 64 of the input member 30 and, on the other hand, to the arcuate groove portion 102 through the right radial hole 118' in the outer cylindrical member 84 and past the axial bore 104' in the right plug member 98' and the right concavity 76' in the socket end portion 64 of the input member 30 and is directed from the first pair of arcuate groove portions 100 and 102 to the first fluid chamber 26 of the power cylinder 18 through the first annular groove 106 in the outer cylindrical member 84 and by way of the passageways 110 in the inner and outer cylindrical members 82 and 84 and the passageway means 112. The fluid pressure thus developed in the first fluid chamber 26 of the power cylinder 18 acts on the piston 24 and moves the piston 24 in the direction indicated by arrow P within the cylinder body 20. The force applied to the piston 24 of the power 18 is transmitted through the coupling means 28 to the toothed rack 14 of the steering gear assembly so that the toothed rack 14 is driven to longitudinally move in the direction of the arrow a not only by the force imparted thereto from the output member 32 of the reaction control mechanism and the pinion gear 16 of the steering gear assembly but by the force thus transmitted from the piston 24 of the power cylinder 18 to the rack 14 of the steering gear assembly. The second fluid chamber 26' of the power cylinder 18 is in communication with the second pair of arcuate groove portions 100' and 102' in the inner cylindrical member 82 through the passageway means 112', the second annular groove 106' in the outer cylindrical member 84 and the passageways 110' in the inner and outer cylindrical members 82 and 94. The second pair of arcuate groove portions 100' and 102' being in communication with the axial bore 34 in the input member 30 through the upper and lower concavities 74 and 74' and the upper and lower radial holes 78 and 78' in the socket end portion 64 of the input member 30, the second fluid chamber 26' of the power cylinder 18 is in communication with the axial bore 34 in the input member 30 through the second pair of arcuate groove portions 100' and 102' and the upper and lower concavities 74 and 74' in the socket end portion 64 of the input member 30 and further through the axial bore 34 in the input member 30 with the fluid reservoir 122 by way of the passageway 124 in the input member 30, the passageway 126 and fluid outlet port 128 in the valve housing 12 and the conduit 130 shown in FIG. 1. The second fluid chamber 26' of the power cylinder 18 being thus permitted to communicate with the fluid reservoir 122, there is no fluid pressure developed in the second fluid chamber 26' of the power cylinder 18 so that the floating piston 24 of the power cylinder 18 is caused to move in the direction of the arrow P by the fluid pressure developed in the first fluid chamber 26.

When, on the other hand, the input member 30 of the reaction control mechanism is caused to turn counterclockwise in FIG. 2 relative to the output member 32 about the axis of rotation thereof, the left and right concavities 76 and 76' in the socket end portion 64 of the input member 30 are isolated from the first pair of arcuate grooves 100 and 102, respectively, and are made open to the second pair of arcuate groove portions 100' and 102', respectively. The fluid pressure directed through the fluid inlet port 114 in the valve housing 12 into the third annular groove 108 in the outer cylindrical member 84 of the valve body 80 is therefore passed on the one hand to the arcuate groove portion 102' through the left radial hole 118 in the outer cylindrical member 84 and past the axial bore 104 in the left plug member 98 and the left concavity 76 in the socket end portion 64 of the input member 30 and, on the other hand, to the arcuate groove portion 100' through the right radial hole 118' in the outer cylindrical member 84 and past the axial bore 104' in the right plug member 98' and the right concavity 76' in the socket end portion 64 of the input member 30 and is directed from the second pair of arcuate groove portions 100' and 102' to the second fluid chamber 26' of the power cylinder 18 through the second annular groove 106' in the outer cylindrical member 84 and by way of the passageways 110' in the inner ans outer cylindrical members 82 and 84 and the passageway means 112'. Furthermore, the upper and lower concavities 74 and 74' in the socket end portion 64 of the input member 30 are isolated from the second pair of arcuate groove portions 100' and 102', respectively, and are open to the first pair of arcuate groove portions 100 and 102, respectively. The first pair of arcuate groove portions 100 and 102 communicating with the first fluid chamber 26 of the power cylinder 18 through the passageways 110 and the passageway means 112 are therefore permitted to communicate with the axial bore 34 in the input member 30 of the reaction control mechanism through the upper and lower concavities 74 and 74' and the upper and lower radial holes 78 and 78', respectively, in the socket end portion 64 of the input member 30, providing communication between the first fluid chamber 26 of the power cylinder 18 and the fluid reservoir 122. The fluid pressure developed in the second fluid chamber 26' of the power cylinder 18 therefore causes the floating piston 24 of the power cylinder 18 to axially move in the direction of arrow P' within the cylinder body 20 in the absence of a fluid pressure in the first fluid chamber 26 so that the toothed rack 14 of the steering gear assembly is driven to move in the direction of arrow b not only by the force imparted to the rack 14 from the output member 32 of the reaction control mechanism and the pinion gear 16 of the steering gear assembly but by the force transmitted from the piston 20 of the power cylinder 18 to the rack 14 through the coupling means 28. The steering system is thus operated by the assistance of the driving force produced by the power cylinder 18 when the input and output members 30 and 32 of the reaction control mechanism are moved into relative angular positions deviating from the neutral angular positions thereof in either direction about the respective axes of rotation of the input and output members 30 and 32.

One of the outstanding advantages of the rotary-motion valve 60 thus constructed and arranged is that the first and second arcuate groove portions 100, 100', 102 and 102' to serve selectively as fluid feed passageways or fluid discharge passageways for the power cylinder 18 can be formed with sufficient preciseness simply by forming the internal circumferential groove 90 and the radial holes 92, 92', 94 and 94' in the inner cylindrical member 82 of the valve body 80 with relatively low preciseness and thereafter fitting the plug members 96, 96', 98 and 98' into the holes. The dimensional accuracy of each groove portion can be easily enhanced by controlling the dimensional accuracy of each of the plug members and the fit between the inner circumferential member 84 and each plug member.

Figure 8:
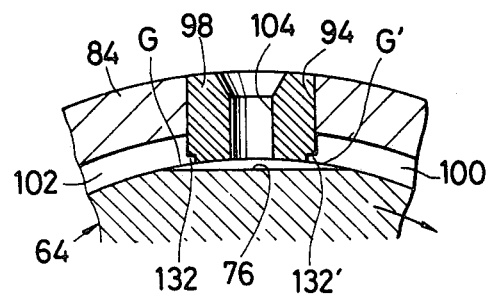
FIG. 8 is a fragmentary cross sectional view showing a modification of the valve body, particularly a plug member forming part of the valve body forming part of the rotary-motion valve embodying the present invention.
Figure 6:
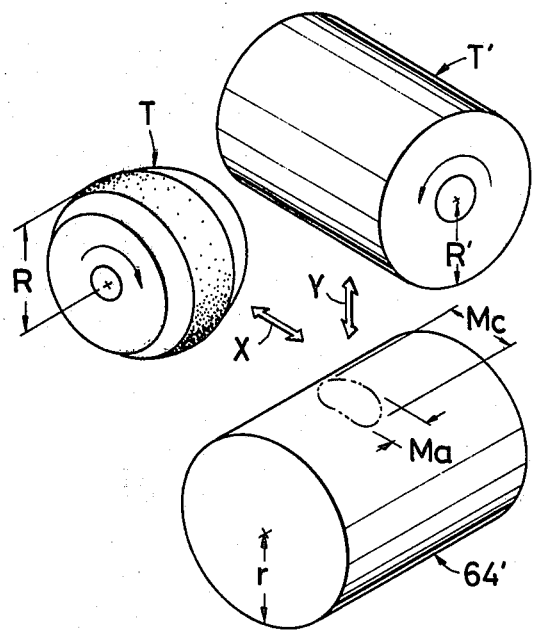
FIG. 6 are perspective view schematically showing preferred examples of the machining arrangement to form concavities in the valve element or socket end portion illustrated in FIG. 3.
Figure 7:
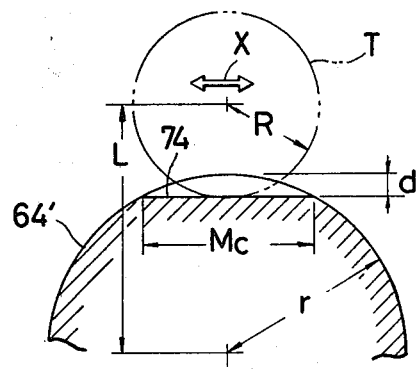
FIG. 7 is a schematic sectional view showing the dimensional relationship in the machining arrangement.

The concavities 74, 74', 76 and 76' in the socket end portion 64 of the input member 30 can be formed by the use of, for example, a generally cask-shaped grinding tool T or a generally cylindrical grinding tool T' illustrated in FIG. 6, wherein the blank to be machined into the socket end portion 64 of the input member 30 is represented by a cylindrical work 64' which is held stationary by suitable clamp means (not shown). If the cask-shaped grinding tool T is to be put to use, the grinding tool is positioned to have its center axis paralleled by the center axis of the work 64' and is driven to rotate about the center axis and concurrently move back and forth on the outer peripheral wall of the work 64' in directions transverse to the axis of rotation of the tool and perpendicular, in non-intersecting relationship, to the center axis of the cylindrical work 64' as indicated by arrows X. If, on the other hand, the cylindrical grinding tool T' is to be used, the grinding tool is positioned to have its center axis perpendicular, in non-intersecting relationship, to the center axis of the cylindrical work 64' and is driven to rotate about the center axis thereof and concurrently move back and forth onto and away from the outer peripheral wall of the work 64' in directions transverse to the center axis of the work 64' as indicated by arrows Y. The grinding tool T or T' being thus driven is forced against the outer peripheral wall of the work 64' until a concavitu 74, for example, is formed to a desired depth d (FIG. 7) in the outer peripheral wall of the work 64'. The depth d of the concavity 74 thus formed in the work' can be varied arbitarily by varying the distance L between the center axis of the work 64' and the center axis of the grinding tool T or T' in relation to the radius r of the cylindrical work 64' and the radius of curvature R of the cask-shaped grinding tool T or the radius R' of the cylindrical grinding tool T' (FIG. 7). By varying the depth of the concavity 74 in this fashion, both of the measurement Ma of the work 64' in a direction parallel with the center axis of the work and the measurement Mc (FIG. 3) of the work 64' in a direction perpendicular, in non-intersecting relationship, to the center axis of the work 64' can be varied without varying the radius of curvature R' of the cask-shaped grinding tool T or the radius R' of the cylindrical grinding tool T'. As previously noted, the axial measurement Ma of the concavity 74 is smaller than the diameter D (FIG. 4) of the plug member 96 to cooperate with the concavity 74 and the circumferential or lateral measurement Mc of the concavity is slightly larger than the diameter D of the plug member 96. Each of the concavities 74, 74', 76 and 76' can be formed in the socket end portion 64 of the input member 30 by machining the work 64' in the above described manner. The dimensional accuracy of ech of the concavities 74, 74', 76 and 76' thus formed in the socket end portion 64 of the input member 30 can be easily and precisely controlled by controlling the depth d alone to which each of the concavities is to be formed in the work 64'. By controlling the depth d to which each concavity is to be formed in the work 64', the circumferential or lateral measurement Mc can be precisely regulated to a desired value even when the radius of curvature R of the grinding tool T or the radius R' of the grinding tool T' may be reduced due to wear of the abrasive surface thereof. This will contribute the prolongation of the service life of the grinding tool to be used and the time intervals at which the grinding tool used is to be inspected for proper dimensional accuracy.

Where a rotary-motion directional fluid-flow control valve according to the present invention is used in a power-assisted steering system as in the embodiment hereinbefore described, it is preferred that each of the plug members 96, 96', 98 and 98' in the inner cylindrical member 82 of the valve body 80 have formed in its inner axial end wall projecting into the internal circumferential groove 90 in the outer cylindrical member 82 a pair of generally arcuate cutouts or depressions which are respectively located at the diametrically opposite ends of the end wall in a circumferential direction of the outer cylindrical member 82 as inducated by broken lines at 132 and 132' in FIG. 4 and in cross section in FIG. 8. Each of these cutouts or depressions 132 and 132' is preferably defined by an arcuate end face substantially perpendicular to the center axis of the plug member and a generally rectangular side face substantially parallel to the center axis of the plug member and accordingly substantially normal to the arcuate end face as will be seen from FIG. 8. Such a cutout or depression may be formed by machining the socket end portion 64 of the input member 30 by the use of an end will by way of example.

Figure 9A:
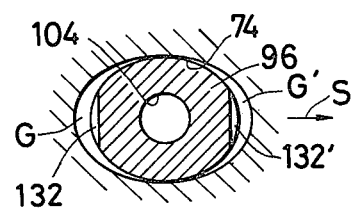
FIGS. 9A, 9B and 9C are schematic sectional views showing different positional relationships between each of the concavities in the valve element or socket end portion shown in FIG. 3 and each of the plub members shown in FIG. 4.
Figure 9B:
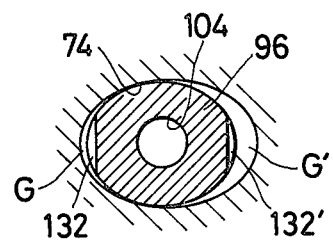
Figure 9C:
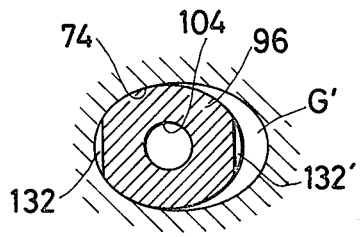
Figure 10:
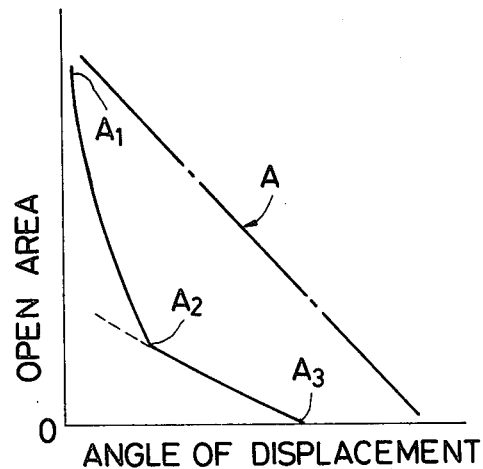
FIG. 10 is a graph showing the rates of variation in the open area formed between the plug member and the associated concavity in the valve element or socket end portion in a rotary-motion valve using the plug member shown in FIG. 8 and the rate of variation in such an open area formed in a rotary-motion valve which is devoid of the feature achieved by the plug member illustrated in FIG. 8.

When the input and output members 30 and 32 of the reaction control mechanism are in the neutral angular positions relative to each other and, as a consequence, each of the plug members 96, 96', 98 and 98' in the inner cylindrical member 82 is located centrally with respect to each of the concavities 74, 74', 76 and 76', respectively, in the socket end portion 64 of the input member 30, the cutout or depressions 132 and 132' thus formed in each of the plug members 96, 96', 98 and 98 are located adjacent the generally crescent-shaped gaps or orifices G and G', respectively, at the opposite lateral ends of each of the concavities 74, 74', 76 and 76' as will be seen from FIG. 9A wherein the concavities 74, 74', 76 and 76' and the plug members 96, 96', 98 and 98' are represented by the upper concavity 74 and the upper plug member 96, respectively. As the input and output members 30 and 32 of the reaction control members 30 and 32 are caused to turn relative to each other from the neutral angular positions thereof about the respective axes of rotation thereof and a consequence each of the concavities 74, 74', 76 and 76' in the socket end portion 64 of the input member 30 is laterally moved in either direction such as the direction of arrow S in FIG. 9A with respect to each of the plug members 96, 96', 98 and 98' in the inner cylindrical member 82 rotatable with the output member 32, the crescent-shaped gap or orifice G on one side of each plug member is gradually constricted or reduced in area and the crescent-shaped gap or orifice G' on the other side of the plug member is gradually enlarged as will be seen from FIG. 9B. When the input and output members 30 and 32 thus caused to turn relative to each other assume certain angular positions deviated from the neutral angular positions thereof, the crescent-shaped gap or orifice G is eliminated so that an open area is at one lateral end of each of the concavities 74, 74', 76 and 76' only by the arcuate cutout or depression 132 in each of the plugs 96, 96', 98 and 98' as will be seen from FIG. 9C. The effective area of the arcuate cutout or dipression 132 in each of the plug members 96, 96', 98 and 98' decreases gradually as the input and output members 30 and 32 of the reaction control mechanism are caused to further turn relative to each other away from the neutral angular positions thereof. When the input and output members 30 and 32 are being angularly displaced relative to each other from the neutral positions thereof toward the angular positions producing the conditions illustrated in FIG. 9C or conversely from the latter angular positions toward the former, the effective open area formed adjacent the arcuate cutput or depression 132 in each of the plug members 96, 96', 98 and 98' varies with the effective area of the crescent-shaped gap or orifice G. When, on the other hand, the input and output members 30 and 32 are being angularly displaced relative to each other past the angular positions indicated in FIG. 9C or backwardly toward such positions, the effective open area formed adjacent the arcuate cutout or depression 132 in each plug member varies with the effective area of the cutout or depression 132. It therefore follows that the effective open area formed adjacent the cutout or depression 132 in each of the plug members 96, 96', 98 and 98' varies at a relatively high rate with respect to the angle of displacement between the input and output members 30 and 32 as indicated by plot $A_1$–$A_2$ in the graph of FIG. 10 when the open area is formed by the crescent-shaped gap or orifice G and the arcuate cutout or depression 132 and at a relatively low rate with respect to the angle of displacement between the input and output members 30 and 32 as indicated by plot $A_2$–$A_3$ in the graph of FIG. 10 when the open area is formed by the arcuate cutout or depression 132 alone. By formation of the arcuate cutout or depressions 132 and 132' in each of the plug members 96, 96', 98 and 98', the effective open area formed adjacent the cutout or depression 132 or 132' thus varies at different rates with respect to the angle of displacement between the input and output members 30 and 32 depending upon the lateral position of each of the plug members with respect to each of the concavutues 74, 74', 76 and 76' in the socket end portion 64 of the input member 30. The stepwise chamge in the effective open area is contrasted by the linear variation in the effective open area formed at one lateral end of a plug member devoid of arcuate cutouts or depressions as will be seen from plot A in the graph of FIG. 10.

When the rotaty-skeeve valve having the cutouts or depressions 132 and 132' in each of the plug members 96, 96', 98 and 98' is incorporated into a power-assisted steering system, the degree of communication between each of the concavities in the socket end portion 64 of the input member 30 and each of the arcuate groove portions 100, 102, 100' and 102' to be respectively isolated from the individual concavities thus varies at a relatively high rate with respect to the angle of displacement between the input and output members 30 and 32. The assistance of hydraulic power from the power cylinder 18 can be extended to the steering system reliably and rapidly in response to a slight angular displacement between the input and output members 30 and 32 of the reaction control mechanism from the neutral angular positions of the input and output members. A response of the control valve being thus made promptly and sensitively to a slight angular displacement between the input and output members 30 and 32, the torsion bar 54 interconnecting the input and output members 30 and 32 of the reaction control mechanism can be constructed with an adequate torsional modulus and for this reason the operator of the steering system is enabled to feel the reaction from the dirigible road wheels of the vehicle with sufficient secsitiveness.

What is claimed is:

1. A rotary-motion directional fluid-flow control valve comprising, in combination, a generally cylindrical valve element rotatable about an axis therethrough and having formed in its outer peripheral wall at least two concavities arranged in predetermined angular relationship to each other about said axis, a generally cylindrical valve body rotatable about an axis substantially in line with the axis of rotation of the valve element and circumferentially slidable on the outer peripheral surface of the valve element, the valve body having a circumferential groove formed in the inner peripheral wall thereof and circumferentially extending over said concavities and at least two radial holes arranged in predetermined angular relationship to each other about the axis of rotation of the valve body, and at least two plug members closely fitting in said radial holes, respectively, and projecting into said circumferential groove for dividing the circumferential groove into arcuate groove portions separate from each other across the plug members, the plug members including a first plug member which is solid in its entirety and a second plug member formed with a bore open at one end to the outer peripheral wall of the valve element and at least partially communicable with one of said concavities depending upon the relative angular positions of the valve element and the valve body about the respective axes of rotation of the valve element and valve body, the valve element and the valve body having predetermined angular positions in which said concavities are substantially in registry with said plug members, respectively, in radial directions of the valve element and the valve body.

2. A rotary-motion directional fluid-flow control valve as set forth in claim 1, in which each of said plug members has radially of the valve body a concave inner face curved substantially conformingly to the inner peripheral surface of the valve body and in which said valve element has concave surface portions respectively forming said concavities in the valve element, each of the surface portions being configured to form part of a geometric cylinder having a center axis substantially perpendicular, in non-intersecting relationship, to the axis of rotation of the valve element.

3. A rotary-motion directional fluid-flow control valve as set forth in claim 2, in which each of said radial holes in said valve body and each of said plug members have substantially circular cross sections having respective center axes in radial directions of the valve body.

4. A rotary-motion directional fluid-flow control valve as set forth in claim 1, 2 or 3, in which each of said plug members has formed in its end portion projecting into said circumferential groove a pair of cutouts at the opposite ends of the end portion in a circumferential direction of the valve body.

5. A rotary-motion directional fluid-flow control valve as set forth in claim 3, in which each of said plug members has formed in its end portion projecting into said circumferential groove a pair of generally arcuate depressions at the diametrically opposite ends on the end portion in a circumferential direction of the valve body.

6. A rotary-motion directional fluid-flow control valve as set forth in claim 5, in which each of said plug members has a center axis in a radial direction of the valve body and has for forming each of said depressions an arcuate end face substantially perpendicular to the center axis of the plug member and a generally rectangular side face substantially parallel to the center axis of the plug member.

7. A rotary-motion directional fluid-flow control valve as set forth in claim 1 or 2, in which each of said radial holes has in a direction parallel with the axis of rotation of said valve body a measurement slightly larger than the width of said circumferential groove in the valve body.

8. A rotary-motion directional fluid-flow control valve as set forth in claim 3, in which the diameter of the circular cross section of each of said radial holes is slightly larger than the width of said circumferential groove in said valve body.

9. A rotary-motion directional fluid-flow control valve as set forth in claim 7, in which each of said concavities in said valve element has in a direction parallel with the axis of rotation thereof an axial measurement smaller than the measurement of each of said plug members in a direction parallel with the axis of rotation of said valve body and in which each of said concavities has in a direction perpendicular, in non-intersecting relationship, to the axis of rotation of said valve element a lateral measurement larger than the measurement of each of the plug members in a direction perpendicular, in non-intersecting relationship, to the axis of rotation of the valve body.

10. A rotary-motion directional fluid-flow control valve as set forth in claim 8, in which each of said concavities in said valve element has in a direction parallel with the axis of rotation thereof an axial measurement smaller than the diameter of the circular cross section of each of the plug members and in a direction perpendicular, in non-intersecting relationship, to the axis of rotation of the valve element a lateral measurement larger than said diameter.

11. A rotary-motion directional fluid-flow control valve as set forth in claim 1, in which said valve element has an axial bore and at least two radial holes open each at one end to said concavities and at the other ends thereof to said axial bore in the valve element.

12. A rotary-motion directional fluid-flow control valve as set forth in claim 1, in which said valve body comprises substantially concentric inner and outer cylindrical members which are fixed relative to each other, said circumferential groove and said radial holes in the valve body being formed in said inner cylindrical member.

13. A rotary-motion directional fluid-flow control valve as set forth in claim 12, in which said outer cylindrical member is formed with first, second and third annular grooves which are separate from each other in the axial direction of the outer cylindrical member, and at least one radial hole open at one end to said third annular groove and at the other end to said bore in said second plug member and in which said inner and outer cylindrical members are formed with passageways providing communication between said first annular groove and one of said arcuate groove portions and passageways providing communication between said second annular groove and the other of said arcuate groove portions.

14. A rotary-motion directional fluid-flow control valve as set forth in claim 13, in which each of said plug members has radially of the inner cylindrical member a convex end face curved substantially conformingly to the outer peripheral surface of the inner cylindrical member.

15. A power-assisted steering system for an automotive vehicle, comprising, in combination, first and second members rotatable relative to each other about a common axis of rotation, a self-centering spring element for interconnecting the first and second rotatable members together and for biasing the two members into a predetermined relative angular relative to lack other about said common axis of rotation, a generally cylindrical valve element rotatable with said first rotatable member and having formed in its outer peripheral wall at least two concavities arranged in predetermined angular relationship to each other about said axis, a generally cylindrical valve body rotatable with said second rotatable member about said axis and circumferentially slidable on the outer peripheral surface of the valve element, the valve body having a circumferential groove formed in the inner peripheral wall of the valve body and circumferentially extending over said concavities at least two radial holes arranged in predetermined angular relationship to each other about axis of the rotation of the valve body, and at least two plug members closely fitting in said radial holes, respectively, and projecting into said circumferential groove for dividing the circumferential groove into arcuate groove portions separate from each other across the plug members, the plug members including a first plug member which is solid in its entirety and a second plug member formed with a bore open at one end to the outer peripheral wall of the valve element and at least partially communicable with one of said concavities depending upon the relative angular positions of the valve element and the valve body about the respective axes of rotation of the valve element and body, said concavities in the valve element being substantially in registry with said plug members, respectivey, in radial directions of the valve element and the valve body when the valve element and body are in said predetermined relative angular positions thereof.

16. A power-assisted steering system as set forth in claim 15, in which each of said plug members has radially of the valve body a concave inner face curved substantially conformingly to the inner peripheral surface of the valve body and in which said valve element has concave surface portions respectively forming said concavities in the valve element, each of the surface portions being configured to form part of a geometric cylinder having a center axis substantially perpendicular, in non-intersecting relationship, to the axis of rotation of the valve element.

17. A power-assisted steering system a set forth in claim 16, in which each of said radial holes in said valve body and each of said plug members have substantially circular cross sections with respective center axes in radial directions of the valve body.

18. A power-assisted steering system as set forth in claim 15, 16 or 17, in which each of said plug members has formed in its end portion projecting into said circumferential groove a pair of cutouts at the opposite ends of the end portion in a circumferential direction of the valve body.

19. A power-assisted steering system as set forth in claim 17, in which each of said plug members has formed in its end portion projecting into said circumferential groove a pair of generally arcuate depressions at the diametrically opposite ends of the end portion in a circumferential direction of the valve body.

20. A power-assisted steering system as set forth in claim 19, in which each of said plug members has a center axis in a radial direction of the valve body and has for forming each of said depressions an arcuate end face substantially perpendicular to the center axis of the plug member and a generally rectangular side face substantially parallel to the center axis of the plug member.

21. A power-assisted steering system as set forth in claim 15 or 16, in which each of said radial holes has in a direction parallel with the axis of rotation of said valve body a measurement substantially equal to the width of said circumferential groove in the valve body.

22. A power-assisted steering system as set forth in claim 17, in which the diameter of the circular cross section of each of said radial holes is substantially equal to the width of said circumferential groove in said valve body.

23. A power-assisted steering system as set forth in claim 21, in which each of said concavities in said valve element has in a direction parallel with the axis of rotation thereof an axial measurement smaller than the measurement of each of said plug members in a direction parallel with the axis of rotation of said valve body and in which each of said concavities has in a direction perpendicular, in non-intersecting relationship, to the axis of rotation of said valve element a lateral measurement larger than the measurement of each of the plug members in a direction perpendicular, in non-intersecting relationship, to the axis of rotation of the valve body.

24. A power-assisted steering system as set forth in claim 22, in which each of said concavities in said valve element has in a direction parallel with the axis of rotation thereof an axial measurement smaller than the diameter of the circular cross section of each of the plug members and in a direction perpendicular, in non-intersecting relationship, to the axis of rotation of the valve element a lateral measurement larger than said diameter.

25. A power-assisted steering system as set forth in claim 15, in which said valve element has an axial bore and at least two radial holes open each at one end to said concavities and at the other ends thereof to said axial bore in the valve element.

26. A power-assisted steering system as set forth in claim 25, in which said valve body comprises substantially concentric inner and outer cylindrical members which are fast on each other, said circumferential groove and said radial holes in the valve body being formed in said inner cylindrical member.

27. A power-assisted steering system as set forth in claim 26, in which said outer cylindrical member is formed with first, second and third annular grooves which are separate from each other in the axial direction of the outer cylindrical member, and at least one radial hole open at one end to said third annular groove and at the other end to said bore in said second plug member and in which said inner and outer cylindrical members are formed with passageways providing communication between said first annular groove and one of said arcuate groove portions and passageways providing communication between said second annular groove and the other of said arcuate groove portions.

28. A power-assisted steering system as set forth in claim 27, in which each of said plug members has radially of the inner cylindrical member a convex end face curved substantially conformingly to the outer peripheral surface of the inner cylindrical member.

29. A power-assisted steering system as set forth in claim 27, further comprising fluid discharge means communicating with one of said axial bore in said valve element and said third annular groove in said outer cylindrical member and fluid inlet means providing communication between a source of fluid under pressure and the other of said axial bore and said third annular groove.

30. A power-assisted steering system as set forth in claim 29, in which one of said first and second rotatable members is connected to a steering wheel and the other of the rotatable member is operatively coupled to the wheel axles of the dirigible road wheels of an automotive vehicle by means of a steering linkage.

31. A power-assisted steering system as set forth in claim 30, in which said self-centering spring element consists of a torsion bar connected at the opposite axial ends thereof to first and second rotatable members and axially extending in part through said axial bore in said valve element.

32. A power-assisted steering system as set forth in claim 31, in which said valve element is integral with said first rotatable member.

33. A rotary motion fluid flow control valve comprising:
a non-rotatable valve housing;
a cylindrical valve body mounted for rotation about its longitudinal axis within said valve housing;
a cylindrical valve element mounted for rotation about its longitudinal axis within said valve body, said rotational axes being substantially coincident;
at least two concavities located in the outer surface of said valve element in a predetermined angular relationship relative to said coincident axes;
a groove extending circumferentially around the inner surface of said valve body, said groove overlying and communicating with each of said concavities;
at least two radial holes in said valve body in the same predetermined angular relationship relative to said coincident axes, said holes communicating with said groove;
a first plug member received in and closing one of said holes, and a second plug member received in the other of said holes and having a bore extending therethrough, the innermost ends of said plugs subdividing said groove into groove segments,
the relative dimensions and shapes of the innermost ends of said plugs and of said concavities being such that the groove segments on opposite sides of said plugs are in communication with each other when said plugs are in radial alignment with said concavities, and the groove segments on opposite sides of said plugs are separated from each other when said plugs are angularly offset relative to said concavities;
fluid inlet means for connecting said bore to a source of pressurized fluid; and,
fluid outlet means leading from said groove segments and from the concavity associated with said first plug member.

* * * * *

UNITED STATES PATENT AND TRADEMARK OFFICE
CERTIFICATE OF CORRECTION

PATENT NO. : 4,290,452
DATED : September 22, 1981
INVENTOR(S) : Koichi Takahashi, Megumu Higuchi It is certified that error appears in the above-identified patent and that said Letters Patent are hereby corrected as shown below:

Claim 15, Column 21, line 30, delete "lack" and insert --each--;

line 58, delete, "respectivey" and insert --respectively--.

Claim 17, Column 22, line 5, after "system", delete "a" and insert --as--.

Signed and Sealed this

Twenty-first Day of September 1982

[SEAL]

Attest:

GERALD J. MOSSINGHOFF

Attesting Officer

Commissioner of Patents and Trademarks